US009020941B1

(12) United States Patent
Gupta et al.

(10) Patent No.: US 9,020,941 B1
(45) Date of Patent: *Apr. 28, 2015

(54) GEOCODING MULTI-FEATURE ADDRESSES

(75) Inventors: Apurv Gupta, Sunnyvale, CA (US); Tushar Khot, Bangalore (IN)

(73) Assignee: Google Inc., Mountain View, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/402,516

(22) Filed: Feb. 22, 2012

Related U.S. Application Data

(63) Continuation of application No. 11/969,510, filed on Jan. 4, 2008, now Pat. No. 8,150,848.

(51) Int. Cl.
*G06F 17/30* (2006.01)
*G06F 17/27* (2006.01)

(52) U.S. Cl.
CPC ............. *G06F 17/27* (2013.01); *Y10S 707/918* (2013.01); *Y10S 707/919* (2013.01); *Y10S 707/921* (2013.01)

(58) Field of Classification Search
CPC .................. G06F 17/30241; G06F 17/30265; G06F 17/30277; Y10S 707/99934; G09B 29/106
USPC ................................... 707/736, 918, 919, 921
See application file for complete search history.

(56) References Cited

U.S. PATENT DOCUMENTS

| 6,101,496 | A  | * | 8/2000  | Esposito ...................... 701/532 |
|-----------|----|---|---------|----------------------------------------|
| 6,331,825 | B1 |   | 12/2001 | Ladner et al.                          |
| 6,615,131 | B1 |   | 9/2003  | Rennard et al.                         |
| 6,934,634 | B1 |   | 8/2005  | Ge                                     |
| 7,047,212 | B1 | * | 5/2006  | Pych et al. .................... 705/27.1 |
| 7,231,405 | B2 | * | 6/2007  | Xia ........................................ 1/1 |
| 7,324,987 | B2 | * | 1/2008  | Hsieh et al. ............................ 1/1 |
| 7,469,182 | B2 |   | 12/2008 | Huang et al.                           |
| 7,644,070 | B2 | * | 1/2010  | Hsieh et al. ................... 707/713 |
| 7,685,108 | B2 | * | 3/2010  | Miller et al. ................... 707/706 |
| 8,626,789 | B2 | * | 1/2014  | Jayanti et al. ................. 707/771 |
| 8,745,065 | B2 | * | 6/2014  | Wang ............................. 707/748 |
| 2004/0138817 | A1 |   | 7/2004  | Zoken et al.                           |
| 2008/0010262 | A1 | * | 1/2008  | Frank ............................... 707/3 |
| 2008/0313142 | A1 | * | 12/2008 | Wang et al. ....................... 707/3 |
| 2012/0271827 | A1 | * | 10/2012 | Merz ............................ 707/737 |

OTHER PUBLICATIONS

Arikawa et al., "Geocoding Natural Route Descriptions using Sidewalk Network Databases", WIRI'05, IEEE, Apr. 8, 2005, pp. 136-144.
Bakshi et al., "Exploiting Online Sources to Accurately Geocode Addresses," Proceedings of the 12th annual ACM international workshop on Geographic information systems, Nov. 2004, pp. 194-203.

(Continued)

*Primary Examiner* — Thanh-Ha Dang
(74) *Attorney, Agent, or Firm* — Fish & Richardson P.C.

(57) ABSTRACT

A system and method of parsing natural language descriptions of features to determine an approximate location. An embodiment includes splitting the natural language descriptions into components, geocoding each component, and returning the geocode with the highest confidence level. The geocode references a specific location, and this information may be determined by content from a variety of sources. The system may use an assortment of techniques for determining highest confidence level.

14 Claims, 8 Drawing Sheets

(56) References Cited

OTHER PUBLICATIONS

Chaiyaput et al., "Classifying Address Components of Thai Mail by Natural Language Processing", ICIT'02, IEEE, Dec. 11, 2002, vol. 2, pp. 1306-1309.

Christen et al., "A Probabilistic Geocoding System based on a National Address File," Data Mining, Lecture Notes in Computer Science vol. 3755, 2006, pp. 130-145.

Christen, "Privacy-Preserving Data Linkage and Geocoding: Current Approaches and Research Directions," Sixth IEEE International Conference on Data Mining Workshops, 2006. ICDM Workshops 2006, Dec. 2006, pp. 497-501.

Cramer, "Direct Geocoding—is Aerial Triangulation Obsolete?" in Fritsch/Spiller (eds.): Photogrammetric Week 1999, Wichmann Verlag, pp. 59-70, Heidelberg, Germany.

Hild and Fritsch, "Integration of Vector Data and Satellite Imagery for Geocoding," International Archives of Photogrammetry and Remote Sensing, vol. 32, part 4, pp. 246-251, 1998.

Yang et al., "A Natural Language Processing Based Internet Agent", IEEE International Conference on Systems, Man, and Cybernetics 1977, Oct. 12, 1997, vol. 1, pp. 100-105.

* cited by examiner

GEOCODING MULTI-FEATURE ADDRESSES

CROSS REFERENCE TO RELATED APPLICATIONS

This application is a continuation of U.S. application Ser. No. 11/969,510, filed Jan. 4, 2008, which is hereby incorporated by reference in its entirety.

FIELD OF THE PRESENT INVENTION

The present invention relates to determining spatial location of features.

BACKGROUND OF THE PRESENT INVENTION

A geocode identifies a geographic location. Generally, geocodes come in the form of coordinates, such as latitude and longitude values. A postal address, or a range of postal addresses, can be associated with a set of coordinates, for example, in a table. Normally, postal addresses are well formatted and hierarchical in structure. For example, a postal address may include a street name, city, state, and zip code. In the table then, each row may contain columns, where each column identifies a different component of the postal address. When given a postal address, a lookup can be performed on the table to identify a row that matches the components of the postal address. A set of coordinates can then be read or approximated based on the chosen row.

The hierarchical nature of a postal address makes it easy to parse and identify the different components of an address, thereby simplifying the geocode finding process for a given postal address. However, problems may arise if an address does not follow these conventions. In some countries, addresses typically include references to multiple features and are not hierarchical. For example, some features may include buildings, stores, or landmarks, and the address describes relative proximity to these features. Performing a table lookup is impractical since there is no defined order to the address, there may be a lack of information concerning typical address components, such as roads or street numbers, and a table cannot recognize a description of a spatial relationship between two or more objects.

What is needed are techniques to geocode addresses that may contain multiple features with no discernible hierarchy.

SUMMARY OF THE PRESENT INVENTION

A system embodiment of this invention geocodes multi-feature addresses. The system embodiment includes an address parser to identify features of an address, a geocoder for determining a geocode for at least one portion of every feature identified, and a confidence analyzer for choosing the highest confidence geocode associated with each feature and intersecting those geocodes to determine a final geocode. The geocoder receives and evaluates results from the address parser, before sending those results to the confidence analyzer. A geocode confidence analyzer and a highest confidence geocode intersector, both part of the confidence analyzer, process the data collected, and pass off their results to the user.

A method embodiment of this invention geocodes multi-feature addresses. The method embodiment includes sending an address to an address parser. The address parser deconstructs the address according to the presence of delimiters to distinguish each feature. Each feature is sent to the geocoder, either serially or in parallel. The geocoder breaks each feature into one or more components, where a set of components is equivalent to the given feature. Each component is geocoded, with a geocode confidence analyzer receiving each geocode. The geocode confidence analyzer collects all the geocodes associated with a particular set of components, merging each, resulting in a highest confidence geocode. A highest confidence geocode intersector takes each highest confidence geocode of each feature, such that it can settle on a final geocode.

In this way, embodiments of this invention may geocode non-hierarchical addresses that contain multiple features.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE PRESENT INVENTION

The present invention relates to determining the coordinates of a location by geocoding multi-feature address terms that may have no set hierarchy. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The following sections describe a system and method for geocoding multi-feature addresses in greater detail. The sections explain a recursive technique to break down an address term into smaller components, leading to the final geocode. Breaking the address term into smaller components allows the system to distinguish between features and regions. From these classifications, the system can then construct one or more hierarchical addresses from the address term. Each hierarchical address is then geocoded, and evaluated based on the merit of its geocoded results. These geocoded results can be combined using various methods to determine the final geocode.

System

Figure 1:
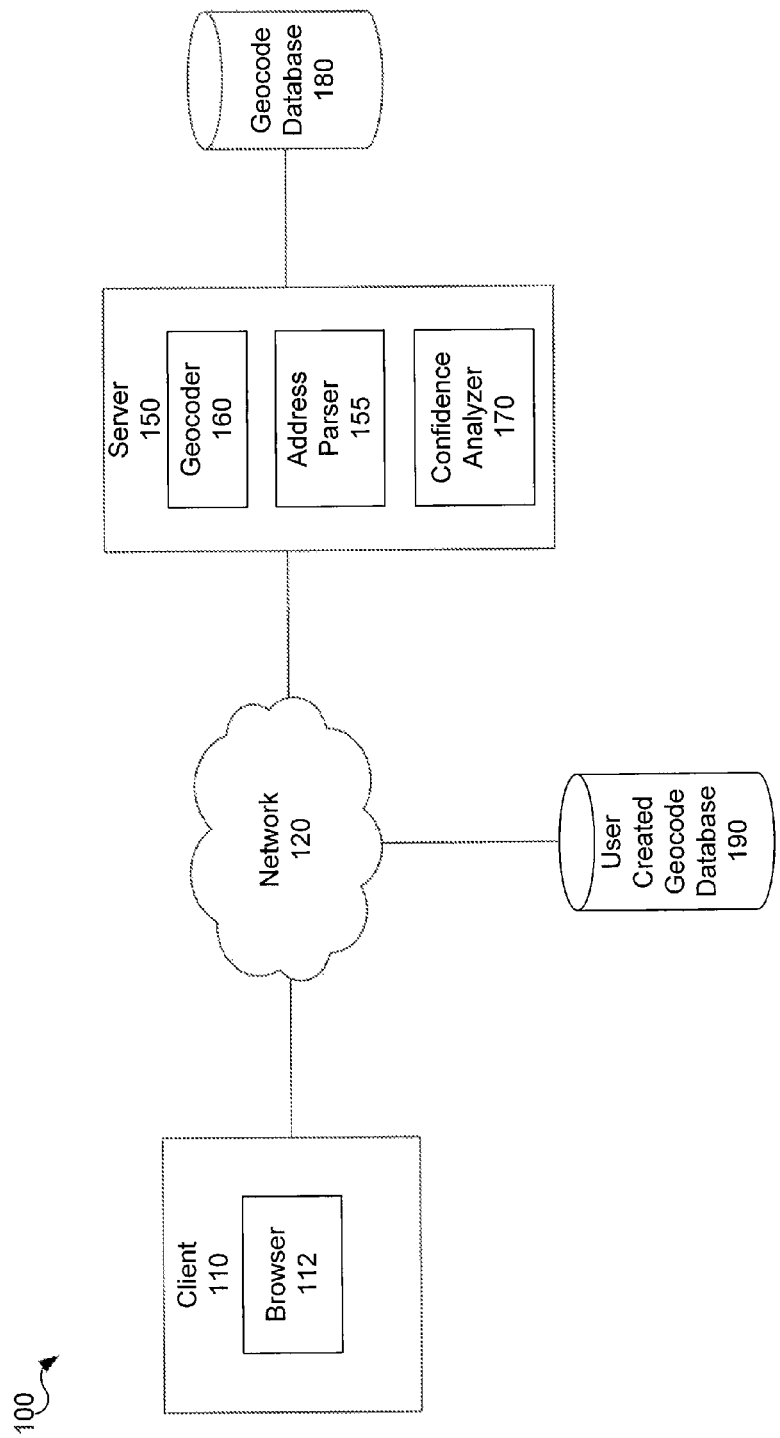
FIG. 1 is an architecture diagram of a system for geocoding multi-feature addresses according to an embodiment of the present invention.

This section describes a system suitable for geocoding multi-feature addresses. Features in a multi-feature address may include, but are not limited to, buildings, stores, or landmarks. FIG. 1 is an architecture diagram of a system for geocoding multi-feature addresses according to an embodiment of the present invention. FIG. 1 shows system 100. System 100 includes a client 110, a server 150, a geocode database 180, and a user created geocode database 190, connected by one or more networks 120. As used herein, the term "database" includes, but is not limited to, table databases, hierarchical databases, network databases, relational databases, dimensional databases, and object databases.

Each of client 110, server 150, geocode database 180, and user created geocode database 190 may be implemented on a computing device. Such a computing device can include, but is not limited to, a personal computer, mobile device such as a mobile phone, workstation, embedded system, game console, television, or set-top box. Such a computing device may include, but is not limited to, a device having a processor and memory for executing and storing instructions. Such a computing device may include software, firmware, and hardware. Software may include one or more applications and an operating system. Hardware can include, but is not limited to, a processor, memory and graphical user interface display.

Client 110, server 150, geocode database 180, and user created geocode database 190 may be implemented on one or more computing devices at the same or at different locations. For instance, client 110, server 150, geocode database 180, and user created geocode database 190 may be remote from one another on different computing devices coupled to a network, such as network 120. In still another example, server 150, geocode database 180, and user created geocode database 190 may be implemented on one or more computing devices at a common location and coupled to a remote client 110 over network 120. Other combinations and configuration for arranging client 110, server 150, geocode database 180, and user created geocode database 190 may be used as would be apparent to a person skilled in the art given this description.

Network 120 may be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

Client 110 includes a browser 112. For example, browser 112 may be a web browser or other type of browser for browsing content. Browser 112 can send a request over network 120 to server 150 and receive a response from server 150. As an example, not to limit the present invention, the request may be an HTTP request. The HTTP request may contain parameters entered by a user using a user interface. The response may be an HTTP response. An HTTP response may contain web content, such as a hypertext markup language (HTML), images, video, or multimedia content.

Server 150 may include a web server or may be coupled to communicate with a web server at the same or a different location. A web server is a software component that responds to a hypertext transfer protocol (HTTP) request with an HTTP response. As illustrative examples, the web server may be, without limitation, Apache HTTP Server, Apache Tomcat, Microsoft Internet Information Server, JBoss Application Server, WebLogic Application Server, or Sun Java System Web Server. The web server may contain web applications which generate content in response to an HTTP request. The web server may package the generated content and serve the content to a client in the form of an HTTP response. Such content may include hypertext markup language (HTML), extendable markup language (XML), documents, videos, images, multimedia features, or any combination thereof. This example is strictly illustrative and does not limit the present invention.

According to an embodiment, server 150 includes an address parser 155, a geocoder 160, and a confidence analyzer 170. Address parser 155 receives address terms from the user at client 110 through browser 112 and breaks up these terms into separate features and regions, such that one or more hierarchical addresses can be created. Geocoder 160 takes these features and regions, and finds geocodes based on part or all of the features, sending the geocodes to confidence analyzer 170. Confidence analyzer 170 then performs operations on the geocodes received, finally sending a single geocode back to browser 112.

Geocode database 180 and user created geocode database 190 define geocodes for a plurality of addresses. A geocode is coordinate information associated with a given address. Coordinate information may include, for example, latitude and longitude values. Each entry may contain address fields, which include, but are not limited to, a state field, a city field, a zip code field, a street field, and a street number field. Each entry may be a single address or range of addresses. Entries found in user created geocode database 190 are created by storing information a user submits about a certain location and finding a geocode related to the information submitted.

Users may not be able to submit data for inclusion in geocode database 180. Geocode database 180 may include entries from various sources. For example, geocode database 180 may include geocoded addresses from local yellow page provider listings. These geocoded listings may be helpful in quickly identifying features of an address if one or more features of an address are directly listed in the local yellow page provider listings. These listings may also be helpful in identifying the location of an unknown feature. If, for example, a set of geocodes from several local yellow page provider listings all point to approximately the same location, all with a common unknown feature, then the unknown feature can be approximated to be near the centroid of these geocoded addresses.

In an embodiment, user created geocode database 190 serves as a backup to geocode database 180. If an attempt to find a geocode in geocode database 180 returns a failure, user created geocode database 190 may then be used to try to find the geocode. Both databases are in place such that a geocode can be found once the non-hierarchical address term is broken into one or more hierarchical addresses.

Each of browser 112, address parser 155, geocoder 160, and confidence analyzer 170 may be implemented as software, hardware, firmware, or any combination thereof.

Figure 2:
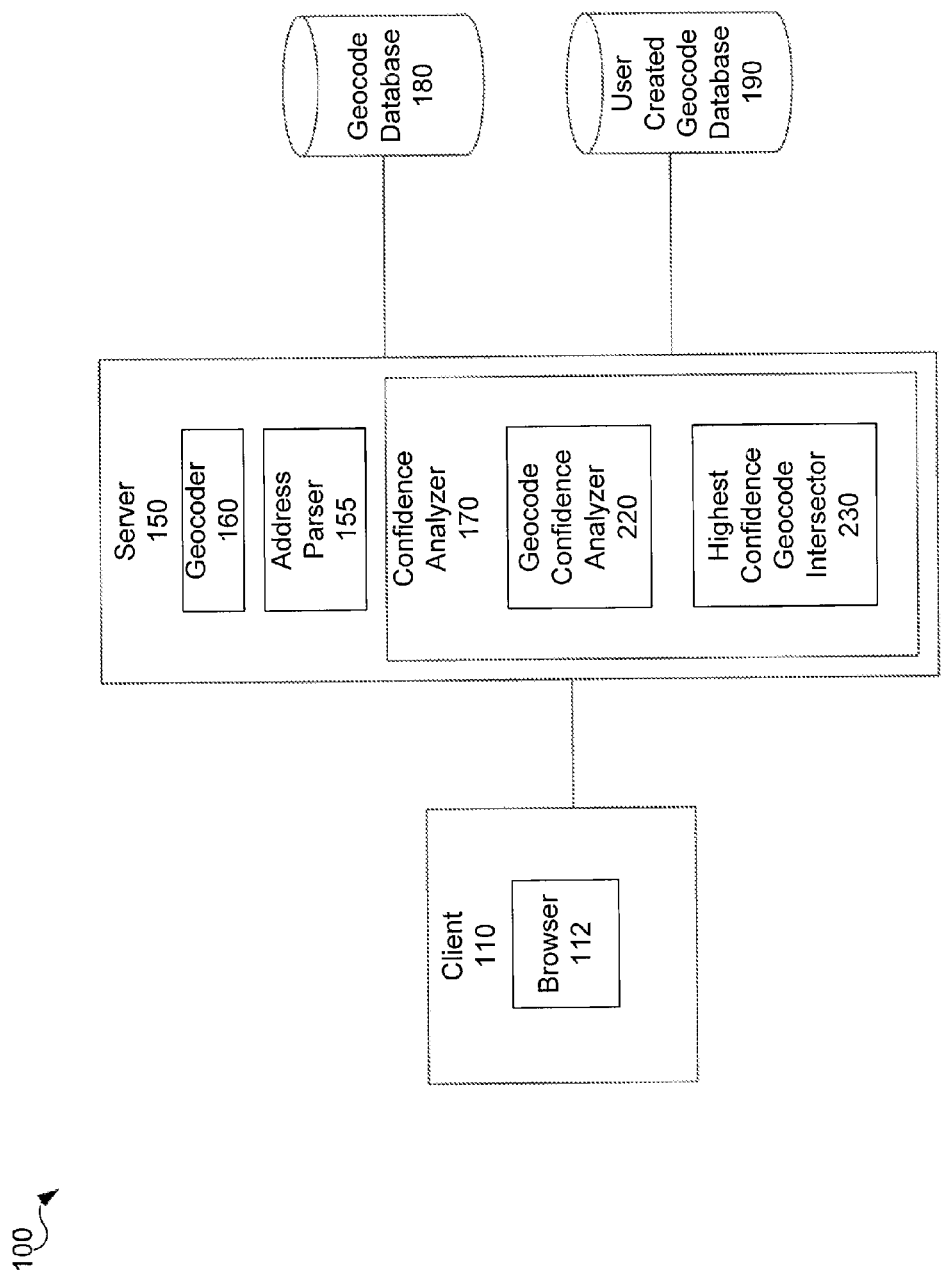
FIG. 2 is a more detailed diagram of the components of the system in FIG. 1 according to an embodiment of the present invention.

System 100 will now be further explored. FIG. 2 shows the components of system 100 in greater detail. As shown in FIG. 2, client 110 may communicate with server 150, and server 150 may communicate with geocode database 180 and user created geocode database 190. As discussed previously, this communication may take place over one or more networks 120, such as the Internet, not shown in FIG. 2.

Confidence analyzer 170 includes a geocode confidence analyzer 220 and a highest confidence geocode intersector 230. Geocode confidence analyzer 220 determines a highest confidence geocode from a plurality of geocodes, and will be described in more detail later. Highest confidence geocode intersector 230 determines a final geocode by evaluating one or more highest confidence geocodes. In one embodiment, highest confidence geocode intersector 230 may find the centroid of one or more highest confidence geocodes to determine the final geocode. In a second embodiment, highest confidence geocode intersector 230 may find the centroid of points nearest to a set of highest confidence geocodes to determine the final geocode.

Geocode confidence analyzer 220 and highest confidence geocode intersector 230 collectively function to determine the merits of the geocode(s) of the one or more artificially created hierarchical addresses. Each operates at a different level of recursion, geocode confidence analyzer 220 at the leaf level and highest confidence geocode intersector 230 at the root level, and each evaluates geocodes based on different criteria.

Each of geocode confidence analyzer 220 and highest confidence geocode intersector 230 may be implemented as software, hardware, firmware, or any combination thereof.

Figure 3:
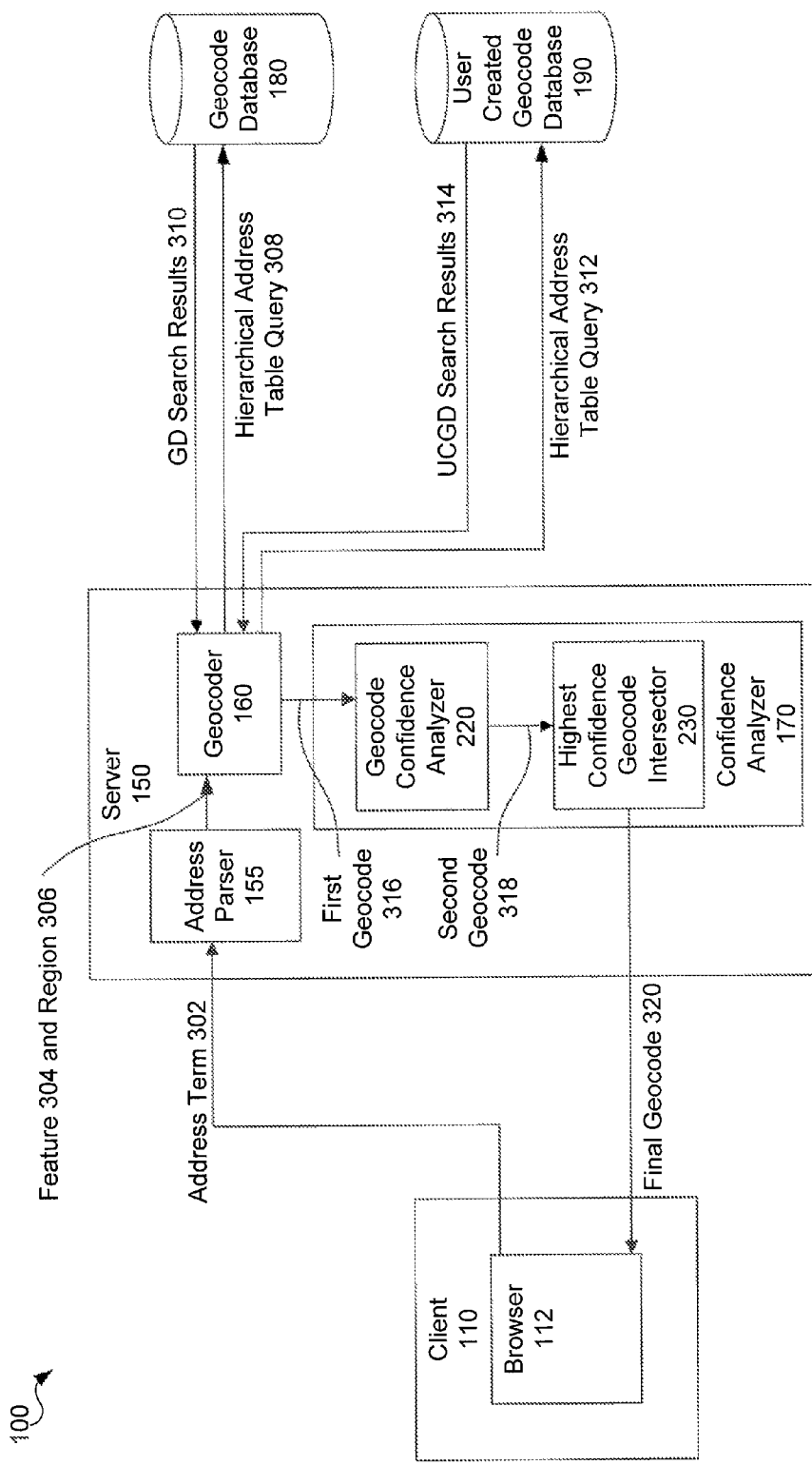
FIG. 3 is a diagram that displays how components of the system may interoperate according to an embodiment of the present invention.

FIG. 3 is a diagram that displays how the components of system 100 may interoperate according to an embodiment of the present invention. Browser 112 may send an address term 302 to server 150. As an example, address term 302 may be HTTP parameters generated by browser 112 using an HTML form. In an example, an HTML form may be displayed by a user interface to a user. The user enters data representing feature and region information into the HTML form using a user interface. The user then presses a submit button on the HTML form. This triggers the browser to generate an HTTP request that includes address term 302 as HTTP parameters. This example is merely illustrative and is not intended to limit the present invention.

Once server 150 receives address term 302, address parser 155 may use address term 302 to generate a feature 304 and a region 306. In an example, feature 304 may include a preposition and region 306 may include the name of a city. One or more features 304 and regions 306 may be used by geocoder 160 in conjunction with confidence analyzer 170 to determine the final geocode to display.

In an embodiment, not shown, regions 306 are obtained from address term 302 by performing a lookup on a database of all known cities, states, and countries. It is expected that regions 306 belong to at least one row of the database completely. The order of regions 306 does not matter, as regions 306 will be reordered into a known hierarchical structure present in the database before sending to geocoder 160. As an example, if address term 302 contains the phrase "Mountain View, Calif.," regions 306 may be set to be "Mountain View, Calif., USA." If address term 302 contains the phrase "USA, California," regions 306 may be set to be "California; USA." Note that the phrase "USA, California" may match "Mountain View, Calif., USA," however it only matches "California, USA" completely.

Geocoder 160 combines one or more features 304 and regions 306 to generate a hierarchical address table query 308 for each pair. Hierarchical address table query 308 may include, but is not limited to, state information, city information, zip code information, street information, or street number information. In this way, geocoder 160 performs the transition from a non-hierarchical address to one or more hierarchical addresses, such that the non-hierarchical address can be further evaluated.

Hierarchical address table query 308 is received by geocode database 180. Geocode database 180 performs a table lookup based on hierarchical address table query 308 and returns geocode database (GD) search results 310.

GD search results 310 is received by geocoder 160. Geocoder 160 analyzes GD search results 310 to determine if a valid geocode has been returned. An invalid geocode may be indicated by geocode database 180 returning a null value. If at least one valid geocode has not been returned, geocoder 160 sends hierarchical address table query 312 to user created geocode database 190, where hierarchical address table query 312 may be similar to hierarchical address table query 308. If at least one valid geocode has been returned from geocode database 180, then geocoder 160 extracts the at least one valid geocode from GD search results 310 and sends a first geocode 316 to geocode confidence analyzer 220.

If a hierarchical address table query 312 has been sent, it is received by user created geocode database 190. User created geocode database 190 performs a table lookup based on hierarchical address table query 312 and returns user created geocode database (UCGD) search results 314.

UCGD search results 314 are received by geocoder 160. Geocoder 160 analyzes UCGD search results 314 to determine if a valid geocode has been returned. If at least one valid geocode has not been returned, the system progresses no further for the given pair of feature 304 and region 306. If at least one valid geocode has been returned, then geocoder 160 extracts the at least one valid geocode from UCGD search results 314 and sends one or more first geocodes 316 to geocode confidence analyzer 220.

First geocode 316 is received by geocode confidence analyzer 220. Geocode confidence analyzer 220 collects a plurality of geocodes via one or more first geocodes 316 and uses these geocodes to send a second geocode 318 to highest confidence geocode intersector 230.

Second geocode 318 is received by highest confidence geocode intersector 230. Highest confidence geocode intersector 230 collects one second geocode 318 for each feature 304, and uses these geocodes to send a final geocode 320 back to browser 112.

The process of converting the at least one valid geocode obtained via either database into a final geocode is described in more detail below.

Figure 4A:
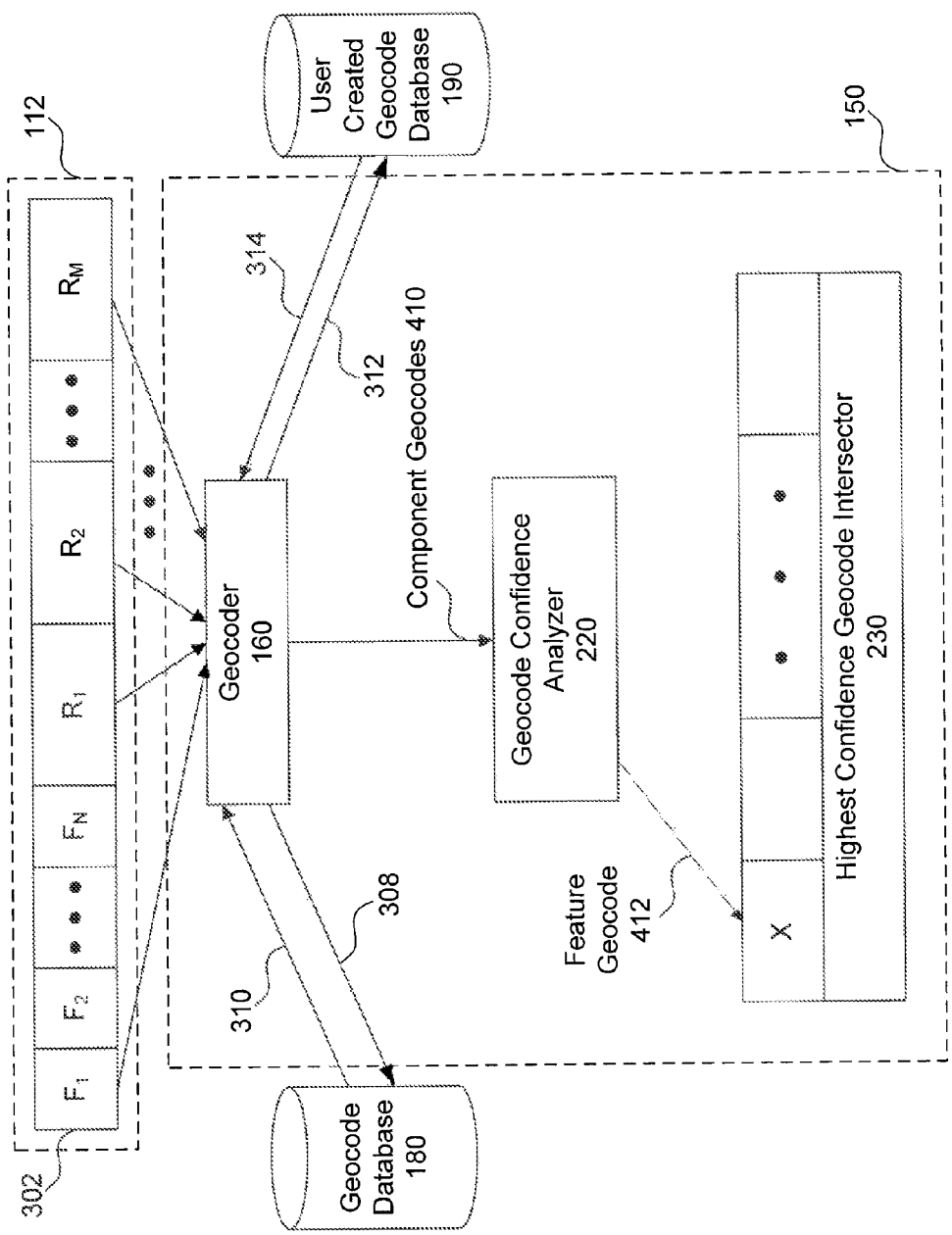
FIGS. 4A-C show the data structures of FIG. 3 in more detail according to an embodiment of the present invention.
Figure 4B:
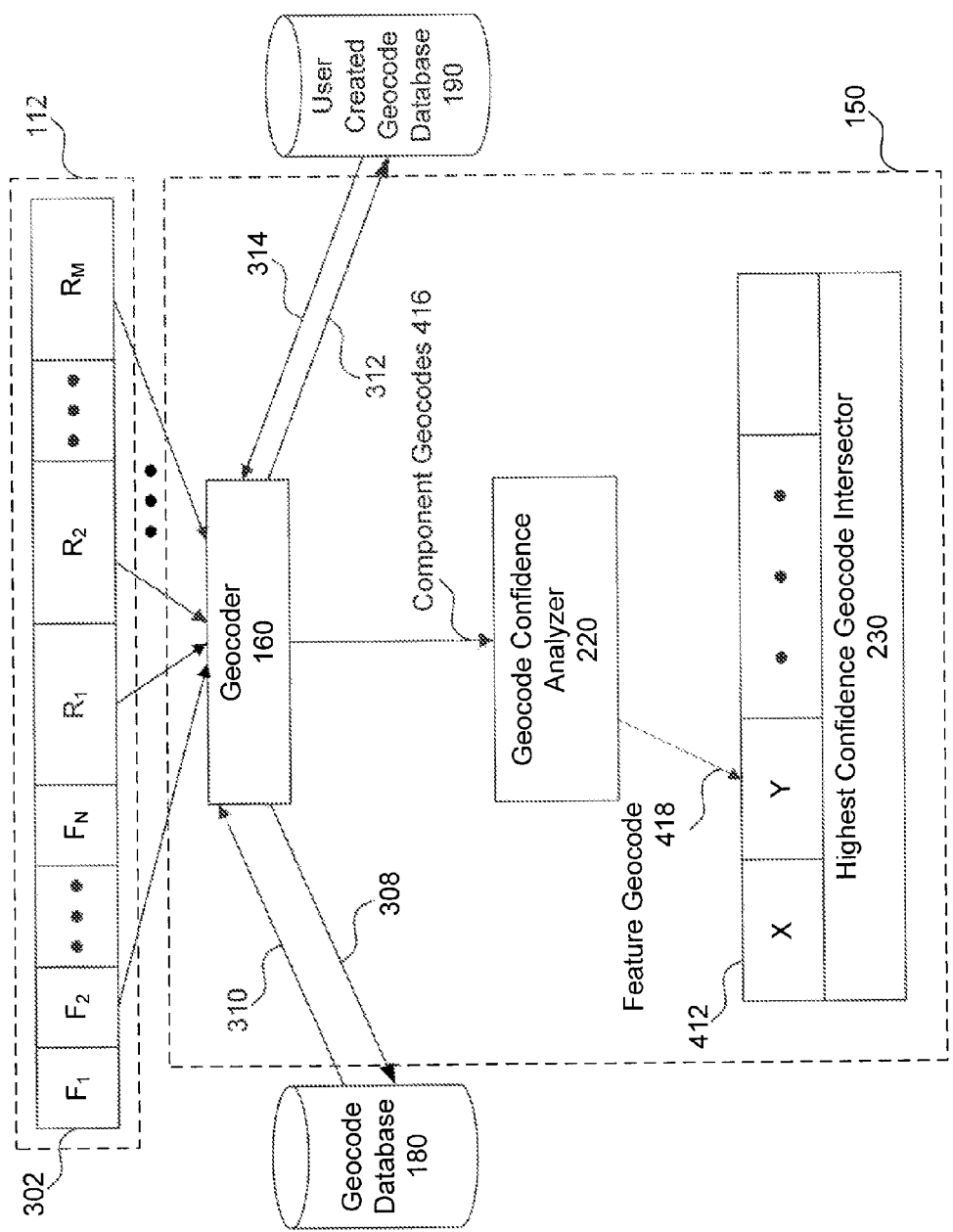
Figure 4C:
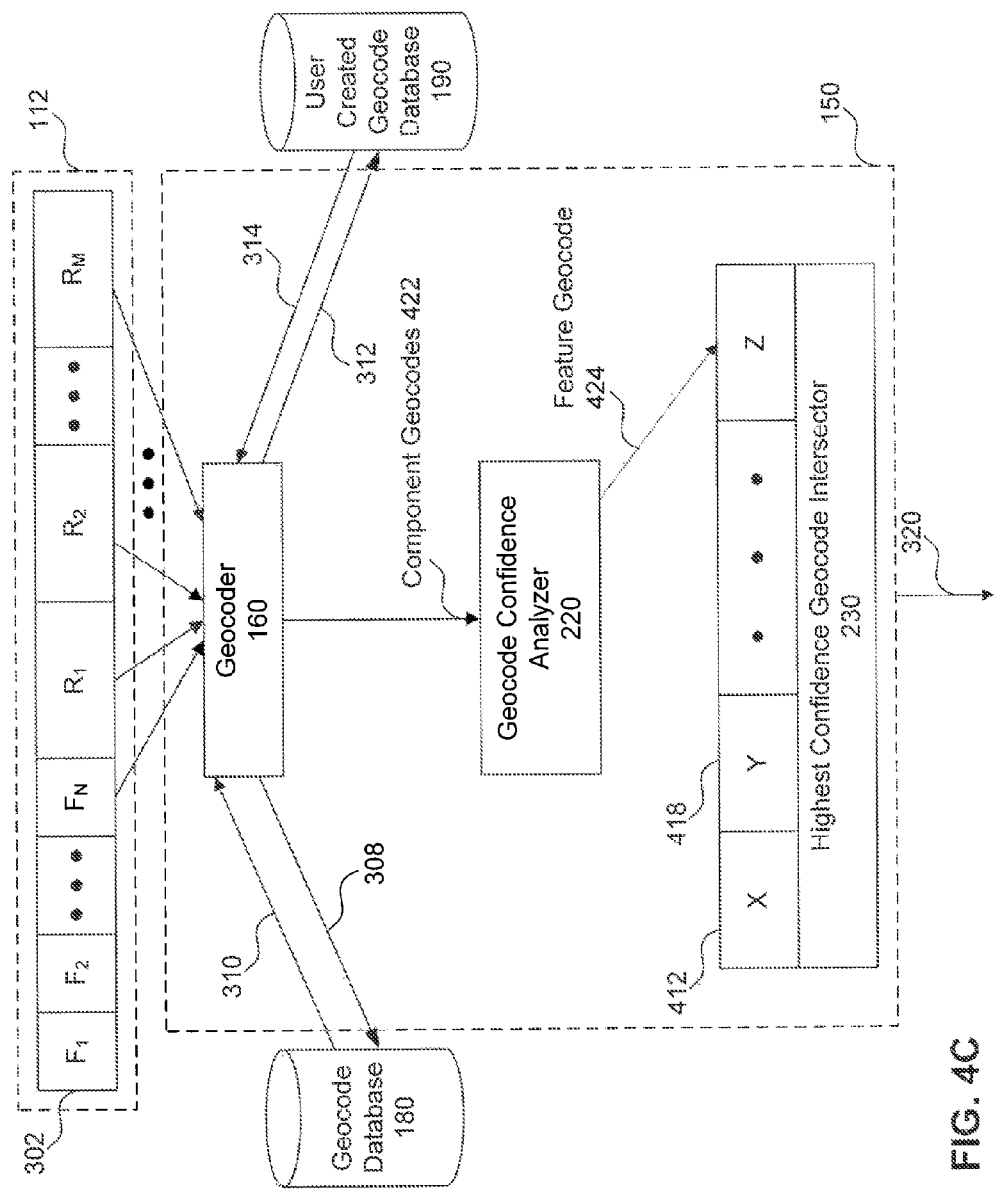

In order to gain a better understanding of the multi-feature geocoding process, a set of step-by-step figures have been provided. FIGS. 4A-C show the data structures of FIG. 3 in more detail according to an embodiment of the present invention, illustrating each step in the geocoding process. FIG. 4A shows the first step in generating final geocode 320. It is assumed here that address term 302 has already been received and split into features and regions by address parser 155. In an embodiment, address parser 155 splits address term 302 into features and regions according to a set of delimiters present in address term 302. The non-hierarchical address term 302 then has been broken into parts that are ready to be converted into hierarchical form. To begin, the first feature $F_1$, and all regions $R_{1-M}$, are sent to geocoder 160.

Feature $F_1$, region $R_1$, region $R_2$, and region $R_M$ are received by geocoder 160. Geocoder 160 may split feature $F_1$ into one or more components, where each component is at least a portion of feature $F_1$. If, for example, feature $F_1$ is "Raj Tours & Travels," geocoder 160 may split feature $F_1$ into components "Raj Tours," "Travels," and/or "Raj Tours & Travels." Each component is combined with region $R_1$, region $R_2$, or region $R_M$ to foam hierarchical address table query 308 and 312.

Once geocode database 180 or user created geocode database 190 has returned a result for all components, geocoder 160 assesses the validity of all geocodes returned. If at least one geocode is valid for a particular component, geocoder 160 generates a component geocode 410, which is analogous to first geocode 316 of FIG. 3. A single component geocode 410 is created for each set of components that produces a valid geocode. A set of components includes components that, when combined, equal the feature they were derived from. In an embodiment, the centroid is found for each component in the set of components. In the above example, assuming all components are valid, geocoder 160 produces two component geocodes 410 for transmission: component geocode 410 for "Raj Tours & Travels" and component geocode 410 for the centroid of "Raj Tours" and "Travels."

Each component geocode 410 is received by geocode confidence analyzer 220. Geocode confidence analyzer 220 may merge each component geocode 410 according to a heuristic. In an embodiment, if all geocodes in component geocode 410 are valid, then the centroid is taken of all geocodes in component geocode 410. If component geocode 410 contains at least one valid geocode, but at least one invalid geocode also, then the centroid for the at least one valid geocode is taken and a confidence score for the component geocode 410 is lowered. The confidence score for component geocode 410 may also fall if it contains many valid geocodes. Many valid geocodes in component geocode 410 may indicate that the configuration of the set of components referenced by component geocode 410 does not further define the desired location with respect to the given region. Likewise, the confidence score for component geocode 410 may rise if it contains few valid geocodes.

This process is repeated for each component geocode 410 received. Geocode confidence analyzer 220 then chooses the component geocode 410 with the highest confidence score. This highest confidence score component geocode 410 is repackaged as a feature geocode 412 and sent to highest confidence geocode intersector 230. One feature geocode 412 is produced for each feature received by geocoder 160. In this case, feature geocode 412 corresponds to feature $F_1$ and is analogous to second geocode 318 of FIG. 3.

Highest confidence geocode intersector 230 receives feature geocode 412. Highest confidence geocode intersector 230 temporarily stores feature geocode 412 until it has received a feature geocode 412 from each feature.

FIG. 4B shows the same process as FIG. 4A, except with regard to feature $F_2$. Based on results from geocode database 180 and/or user created geocode database 190, geocoder 160 produces one or more component geocodes 416. Geocode confidence analyzer 220 takes the one or more component geocodes 416 in order to produce a feature geocode 418.

FIG. 4C shows the same process as FIGS. 4A and 4B, except with regard to feature $F_N$. Based on results from geocode database 180 and/or user created geocode database 190, geocoder 160 produces one or more component geocodes 422. Geocode confidence analyzer 220 takes the one or more component geocodes 422 in order to produce a feature geocode 424.

Highest confidence geocode intersector 230 has now received feature geocode 412, 418, and 424, which correspond to all features $F_1 \ldots _N$. Highest confidence geocode intersector 230 may find the centroid of each feature geocode 412, 418, and 424 if each contains one geocode. In an embodiment, if any feature geocode 412, 418, or 424 contains more than one geocode, then the point of that feature geocode 412, 418, or 424 closest to the other features geocodes is found. Highest confidence geocode intersector 230 then takes the centroid of the nearest points. Taking the centroid using either method produces final geocode 320. Final geocode 320 is sent to browser 112.

In this way, multiple features within address term 302 are recursively handled, such that the one or more geocodes produced by the hierarchical combination of each individual feature and region have been narrowed to a final geocode. The following section describes the method involved in arriving at the final geocode according to an embodiment of the present invention.

Method

Figure 5:
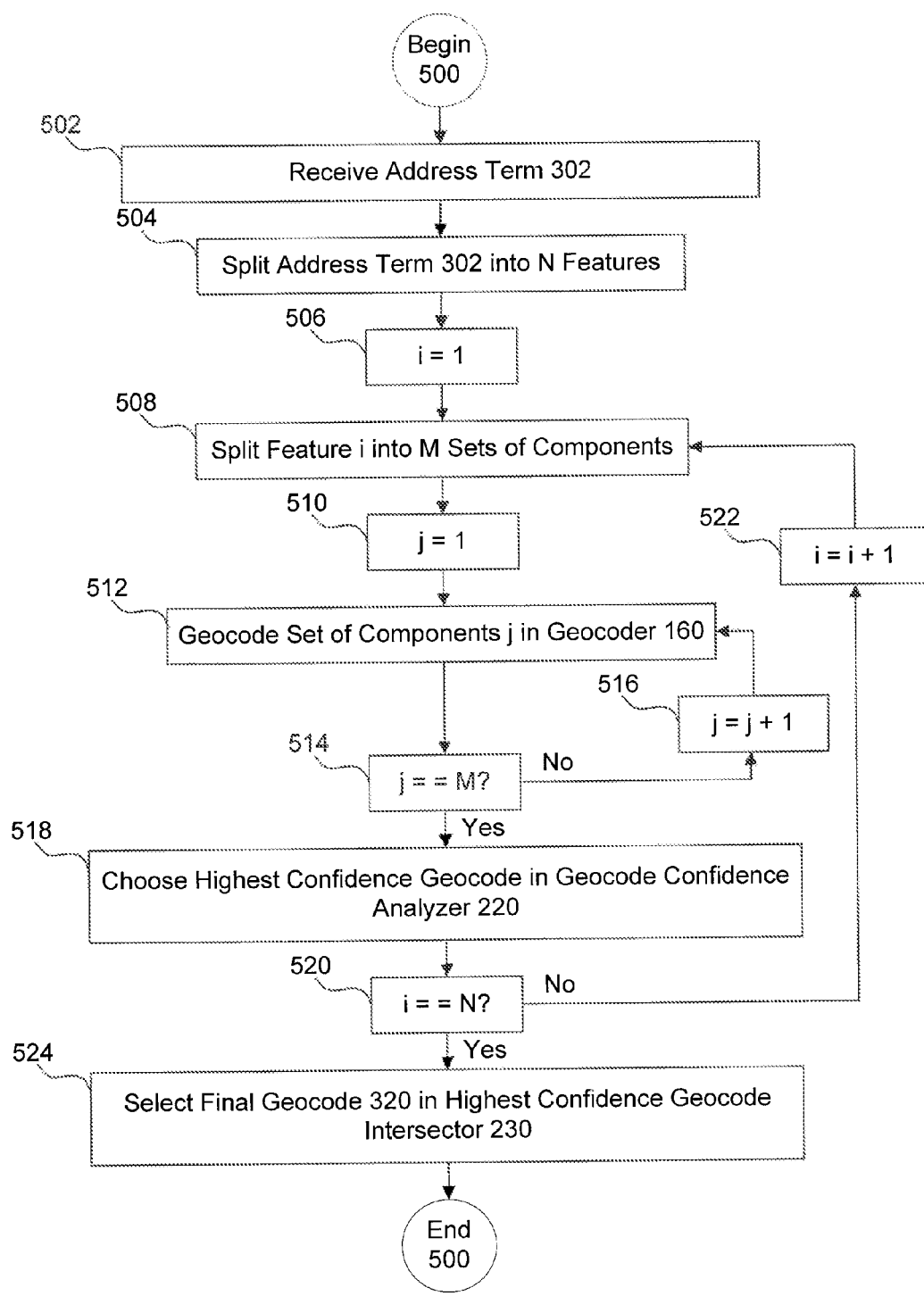
FIG. 5 is a flowchart showing a method for generating multi-feature address geocodes according to an embodiment of the present invention.

FIG. 5 is a flowchart showing a method 500 for generating multi-feature address geocodes. In an example, not to limit the invention, method 500 may be used in operation of system 100. Method 500 begins at step 502, where an address term 302 is received. Method 500 then proceeds to step 504, which splits address term 302 into N features. The N features are determined by delimiters present in the address term 302 and the rules associated with dealing with the delimiters. Step 504 may be completed in address parser 155. Once this has been completed, method 500 can move on to step 506.

In an embodiment, step 506 may be completed by geocoder 160 in FIG. 1. Step 506 sets an initial value for variable i. Variable i determines which of the N features is to be evaluated. Once the initial value has been set, method 500 proceeds to step 508.

Step 508 involves splitting the feature $F_i$ into M sets of components, where each set of components includes at least one component. The set of components, when combined, equal feature i. This step is completed in geocoder 160. Method 500 proceeds to step 510 when all M sets of components have been determined.

Step 510 sets an initial value for variable j. Variable j determines which of the M sets of components is to be evaluated. In an embodiment, this step may also be completed in geocoder 160. Once the initial value has been set, method 500 proceeds to step 512.

Step 512 is also completed within geocoder 160. This step involves finding one or more geocodes of the set of components indicated by variable j. Method 500 proceeds to step 514 after geocoder 160 transmits to geocode confidence analyzer 220 the one or more geocodes it receives for set of components j.

Step 514 executes a comparison, checking to see if the value of variable j equals M. If it does not, method 500 proceeds to step 516. If it does, method 500 proceeds to step 518, indicating all sets of components of the feature designated by variable i have been evaluated.

Step 516 increments the value of variable j by 1. This new value of variable j is used in step 512. Steps 512 through 514 are then repeated.

Step 518, completed within geocode confidence analyzer 220, merges each geocode of each set of components, and chooses the geocode with a highest confidence score among all set of components for feature i. This geocode with a highest confidence score is sent to highest confidence geocode intersector 230. Method 500 then proceeds to step 520.

Step 520 executes a comparison, checking to see if the value of variable i equals N. If it does not, method 500 proceeds to step 522. If it does, method 500 proceeds to step 524, indicating all features of address term 302 have been evaluated.

Step 522 increments the value of variable i by 1. This new value of variable i is sent to step 508. Steps 508 though 520 are then repeated.

Step 524 takes the geocodes calculated to have the highest confidence score for each feature, and finds the centroid of these geocodes. The geocode generated by finding the centroid is sent to browser 112 as final geocode 320. This step is completed within highest confidence geocode intersector 230, and ends method 500 once completed.

It should be noted that the above described method 500 presents a serial process. In another embodiment, the above method 500 may be completed using a parallel process, in which some or all features are processed concurrently. Method 500 explains the steps taken from receiving a non-hierarchical address term to forming hierarchical addresses. It also shows how an indefinite number of features are handled when determining the final geocode.

Figure 6:
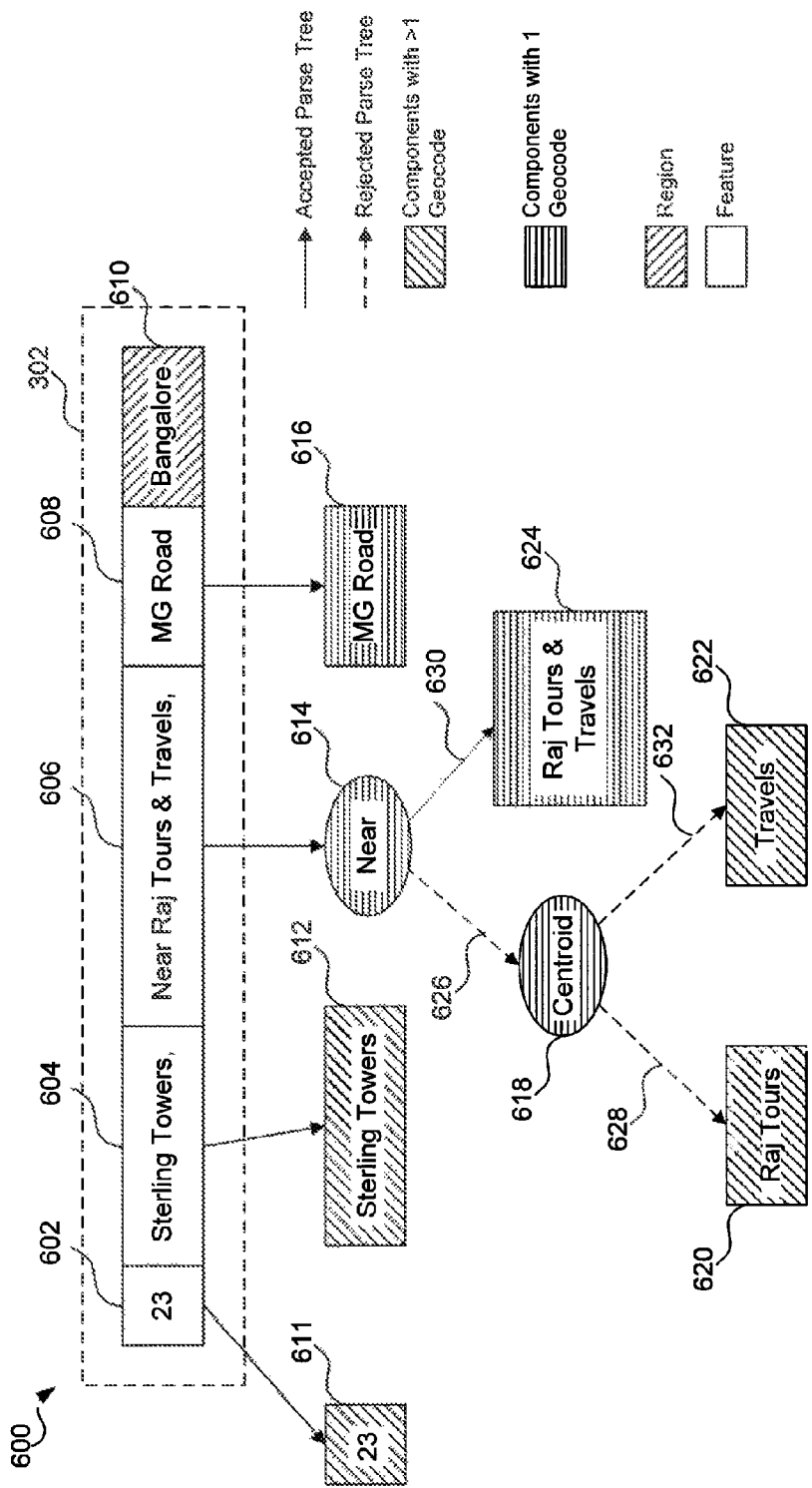
FIG. 6 is an example operation to determine the geocode of a multi-feature address according to an embodiment of the present invention.

To fully understand how address term 302 of FIG. 3 can be manipulated, it is best to view an example. FIG. 6 is an example operation 600 to determine the geocode of a multi-feature address. As shown in FIG. 6, address term 302 contains four features 602, 604, 606, and 608, and one region 610, determined by any delimiters present. Each feature 602, 604, 606, and 608 is broken up into components.

Feature 602 is one phrase, and therefore broken up into one component 611. Feature 604 is also one phrase, since "Sterling Towers" can be considered a proper name and it includes no internal delimiters. Feature 604 is, therefore, broken up into one component 612. It should be noted that spaces can also be considered delimiters, however, in this example, spaces have been ignored as delimiters. Feature 606 contains a plurality of phrases, and can therefore be broken up into many components.

Oval 614 functions as a delimiter between features 604 and 606, where the word "Near" gives directional information indicating how the desired location may relate to other components of feature 606. Feature 606 can be split into two main branches. The first branch, following path 626, starts at oval 618. "Centroid" indicates what will be done with the components beneath. Components 620 and 622 are such because the "&" in feature 606 can be considered an internal delimiter, separating two different components that the desired location may be "Near." In this example, components 620 and 622 both produce more than one geocode when paired with region 610. The centroid is calculated for the geocodes for components 620 and 622 because together, components 620 and 622 contribute to feature 606. A geocode cannot be chosen as the final geocode unless it represents the entire feature. Taking the centroid ensures that the geocode represents the entire feature.

The second main branch, following path 630, starts and ends at component 624. Here, it is assumed the "&" serves as part of a proper name, not as a delimiter. In this case, component 624 produces one geocode when paired with region 610.

According to rules presented before, the centroid of the geocodes for component 620 and 622 is compared to the geocode for component 624. Since component 624 yields only one geocode, its confidence score is higher than that of the centroid of geocodes 620 and 622. Component 624 then yields the highest confidence geocode for feature 606. This is shown in FIG. 6 as the solid path line 630. The dotted path lines 626, 628, and 632 indicate that this was not the chosen path.

It should be noted that in some cases, "Near" in feature 606 may not be considered a delimiter, but rather part of a proper name. While not shown, in this example, using "Near" as part of the proper name might yield a component referring to "Near Raj Tours" or "Near Raj Tours & Travels."

Feature 608 is one term, since it is the proper name of a road and includes no internal delimiters. Feature 608 is, therefore, treated as one component 616. The geocodes for each chosen component of each feature are intersected to produce final geocode 320. In an embodiment, this intersection may come about by taking the centroid of all geocodes for each chosen component of each feature.

As the above method describes, the lack of a hierarchical address is no longer a hindrance when determining a geocode. An indefinite number of features may be provided to help settle on a location, and prepositional phrases or the like describing a location do not hinder efforts to determine this geocode.

CONCLUSION

The ability to geocode multi-feature addresses allows users to find the coordinates of locations in which they do not know or remember an address, or in which there is no definitive hierarchical structure to define the address.

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method of geocoding a multi-feature address, comprising:
 (a) receiving an address term comprising a region and a feature;
 (b) splitting the address term into the region and the feature, the feature including two or more components;
 (c) splitting the feature into two or more separate components, wherein each separate components includes at least one component, and each separate component is different from each other separate component, and for each separate component from the feature, determining a respective component geocode representing a location of a component and an associated component confidence score, the determining comprising:
  (i) determining at least one geocode based on the region and the component, (ii) determining the respective component geocode representing the location of the component based on the at least one geocode determined in (i), and (iii) determining a component confidence score for the respective component geocode inversely related to a number of geocodes determined in (i) for the component; and
 (d) selecting an address geocode representing a location of the address term as the component geocode determined in (c)(ii) according to the corresponding component confidence score determined in (c)(iii),
 wherein steps (a)-(d) are each performed on at least one computing device.

2. The method of claim 1, further comprising parsing the address term into the region and the feature based on one or more delimiters in the address term.

3. The method of claim 2, wherein each of the one or more delimiters includes one of a word, a punctuation character, or a blank space.

4. The method of claim 1, the determining (c) further comprising generating geographical coordinate information that includes latitude and longitude values.

5. The method of claim 4, wherein the generating geographical coordinate information comprises: selecting the geographical coordinate information from a geocode database.

6. The method of claim 4, wherein the generating geographical coordinate information comprises: selecting the geographical coordinate information from a publicly available user created geocode database.

7. The method of claim 1, wherein the determining (c)(ii) comprises: determining the respective component geocode as a centroid of the geocodes in (c)(i).

8. A system of geocoding an address, comprising:
an address parser, configured to receive an address term comprising a region and a feature, and split the address term into the region and the feature, the feature including two or more components, and to splitting the feature into two or more separate components, wherein each separate components includes at least one component, and each separate component is different from each other separate component, and
a geocoder configured, for each separate component from the feature, to determine a respective component geocode representing a location of a component and an associated component confidence score by:
(a) determining at least one geocode based on the region and the component,
(b) determining the respective component geocode representing the location of the component based on the at least one geocode determined in (a), and
(c) determining a component confidence score for the respective component geocode inversely related to a number of geocodes determined in (a) for the component; and
a geocode confidence analyzer configured to select an address geocode representing a location of the address term as the component geocode determined by the geocoder in (b) according to the corresponding component confidence score determined by the geocoder in (c),
wherein the address parser, geocoder, and geocode confidence analyzer are implemented on at least one computing device.

9. The system of claim 8, wherein the address parser is configured to parse the address term into the region and the feature based on one or more delimiters in the address term.

10. The system of claim 9, wherein each of the one or more delimiters includes one of a word, a punctuation character, or a blank space.

11. The system of claim 8, wherein the geocoder generates geographical coordinate information that includes latitude and longitude values.

12. The system of claim 11, further comprising: a geocode database, wherein the geocoder selects the geographical coordinate information from the geocode database.

13. The system of claim 11, further comprising: a publicly available user created geocode database, wherein the geocoder selects the geographical coordinate information from the geocode database.

14. The system of claim 8, wherein the geocoder determines the component geocode as a centroid of the geocodes determined by the geocoder for the component.

\* \* \* \* \*